United States Patent [19]
Hanna

[11] 3,899,799
[45] Aug. 19, 1975

[54] PIT MOUNTED BRUSH ASSEMBLY
[76] Inventor: Daniel C. Hanna, 1133 S.W. Rivington Dr., Portland, Oreg. 97201
[22] Filed: Jan. 2, 1974
[21] Appl. No.: 429,931

[52] U.S. Cl. .............................. 15/21 D; 15/DIG. 2
[51] Int. Cl.² ............................................ B60S 3/06
[58] Field of Search ...... 15/21 R, 21 B, 21 D, 21 E, 15/53, 97

[56] References Cited
UNITED STATES PATENTS
3,035,293  5/1962  Larson .................................. 15/21 D
3,241,167  3/1966  Murillo et al. ....................... 15/21 D
3,310,824  3/1967  Beer ..................................... 15/21 D
3,581,334  6/1971  Follis ................................... 15/21 D Primary Examiner—Edward L. Roberts
Attorney, Agent, or Firm—Klarquist, Sparkman, Campbell, Leigh, Hall & Whinston

[57] ABSTRACT

Brushes normally are held by knuckled arms in up positions so as to be engaged by central front portions of cars to be washed, which push the brushes down. The arms then fold to move the brushes rearwardly, and then, as the rear portions of the cars move over the brushes, the arms raise the brushes and move them with the cars to clean the central, rear portions of the cars.

10 Claims, 12 Drawing Figures

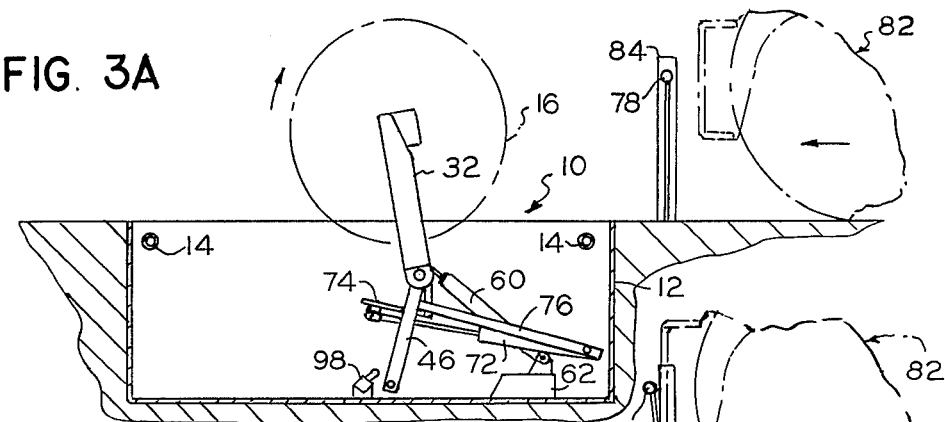
FIG. 3A
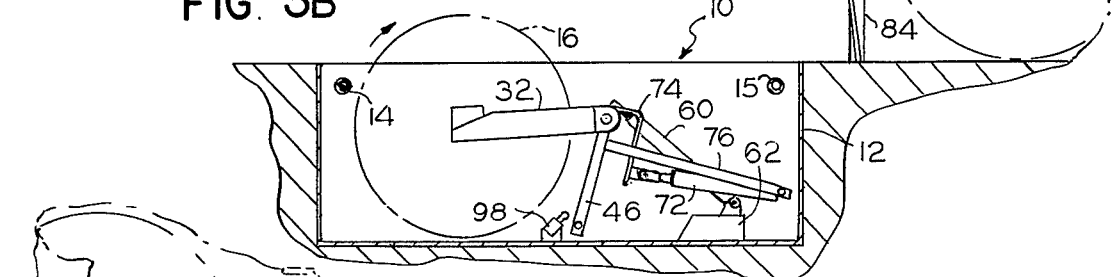
FIG. 3B
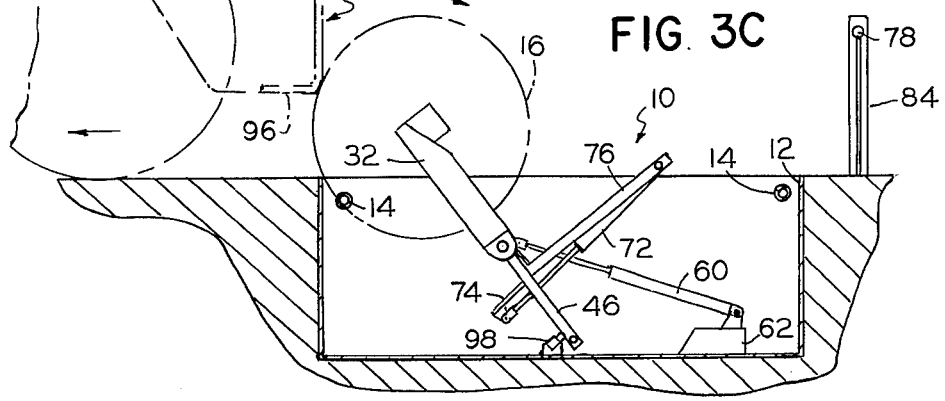
FIG. 3C
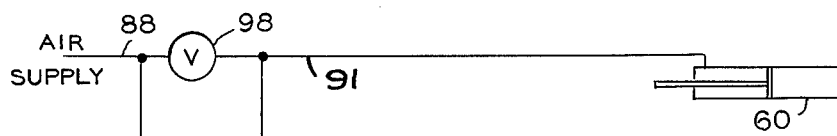
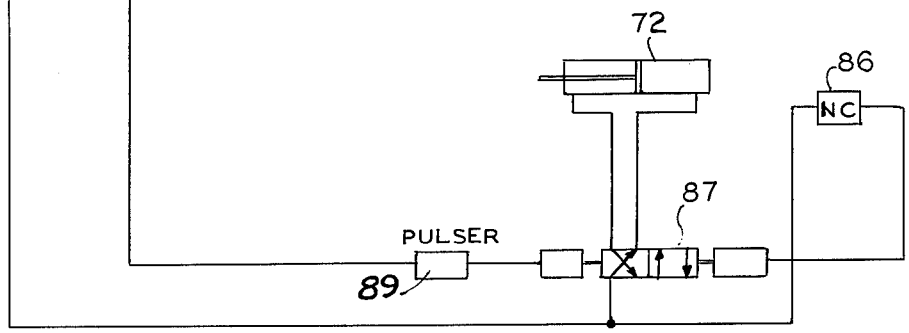
FIG. 4

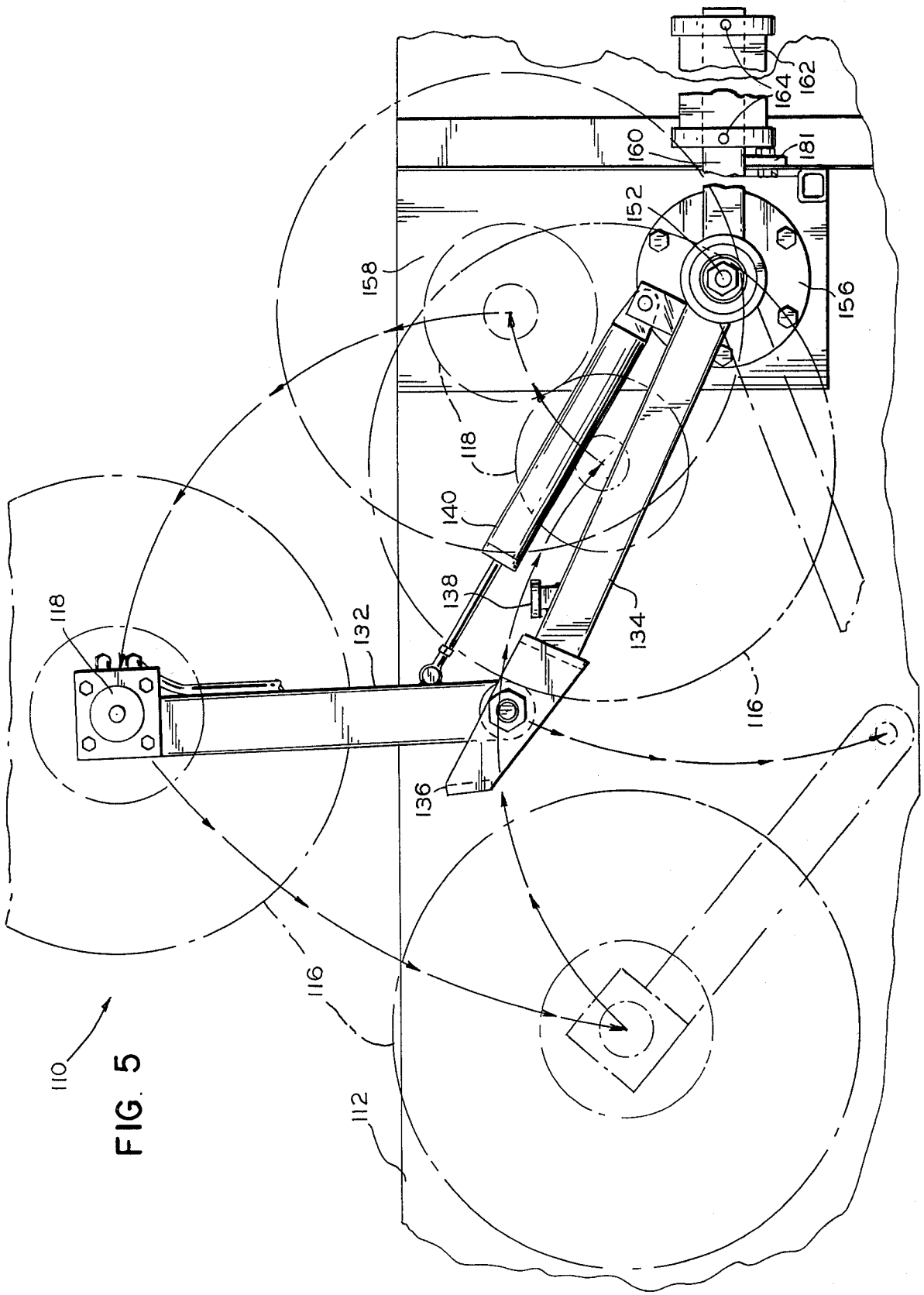

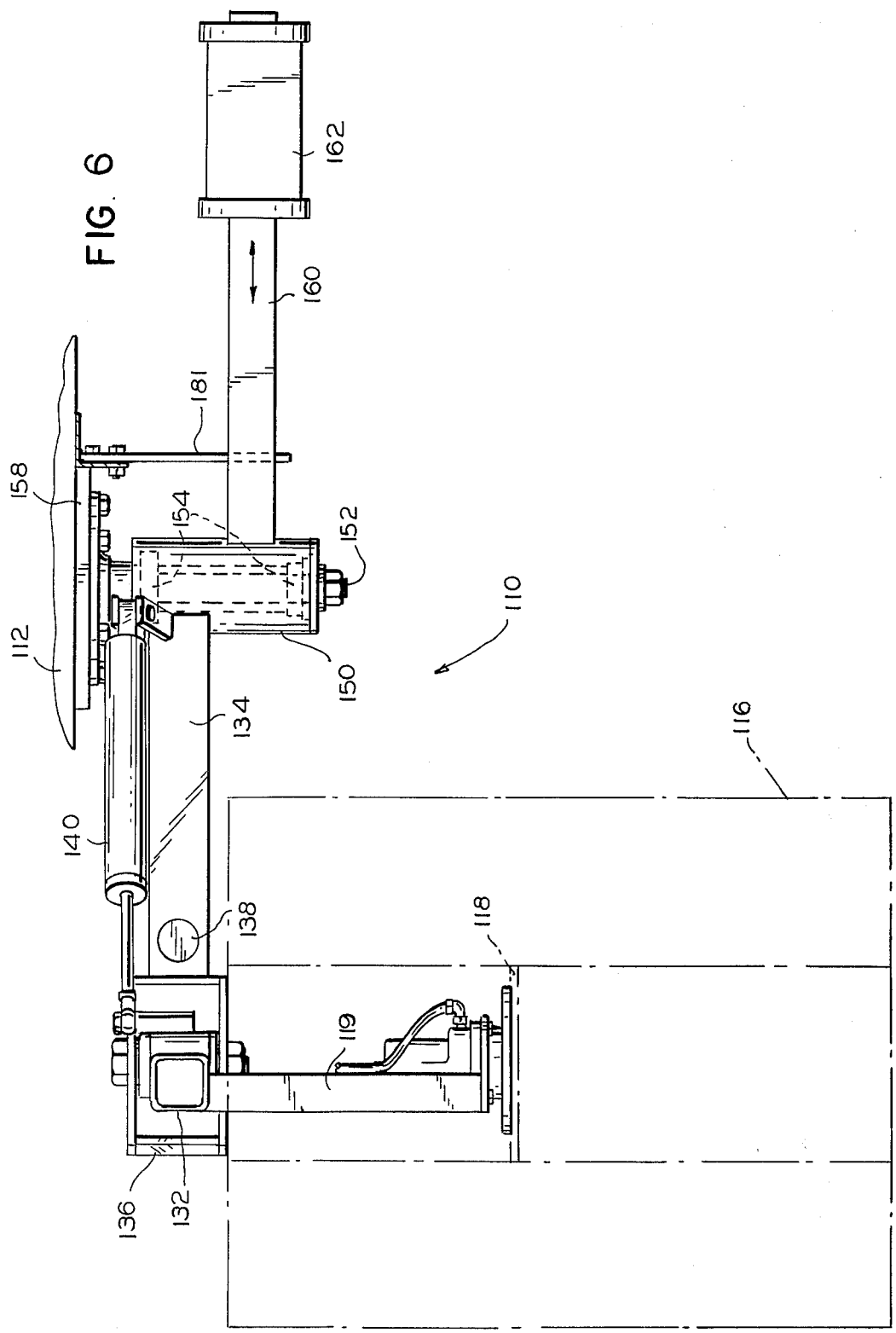

PIT MOUNTED BRUSH ASSEMBLY

DESCRIPTION

This invention relates to and has for an object thereof the provision of new and improved pit mounted brush assemblies.

Another object of the invention is to provide a brush assembly for brushing the central, lower portions of the front and rear of a car.

Another object of the invention is to provide a brush assembly mounted under the path of a car to be cleaned and adapted to move with a car advanced thereover.

Another object of the invention is to provide a brush assembly mounted in a pit shell and transportable in the shell.

A further object of the invention is to provide a brush assembly in which a brush is pushed forwardly and downwardly by the front portion of a car, knuckled arms carrying the brush are folded to move the brush rearwardly and, as the rear end portion of the car moves over the brush, the arms are unfolded to move the brush upwardly and forwardly so that the brush engages and brushes the rear portion of the car.

In the drawings:

FIGS. 3A, 3B and 3C are a series of schematic views showing the sequence of operation of the brush assembly of FIG. 1;

FIG. 4 is a circuit diagram of the brush assembly of FIG. 1;

FIG. 5 is a fragmentary, side elevation view of a pit mounted brush assembly forming an alternate embodiment of the invention;

FIG. 6 is a fragmentary top plan view of the brush assembly of FIG. 5; and

Figure 1:
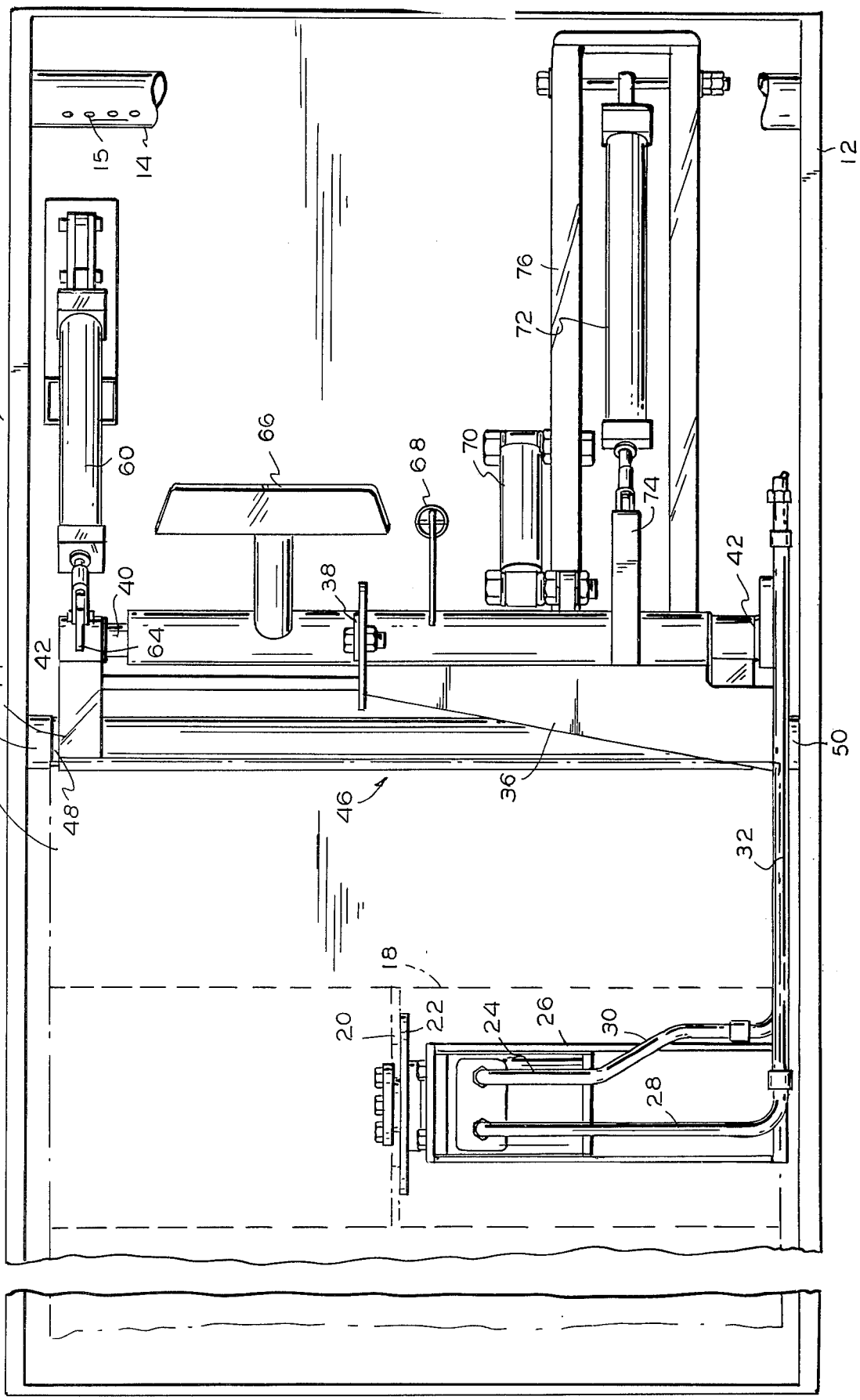
FIG. 1 is a fragmentary top plan view of a pit mounted brush assembly forming one embodiment of the invention.
Figure 2:
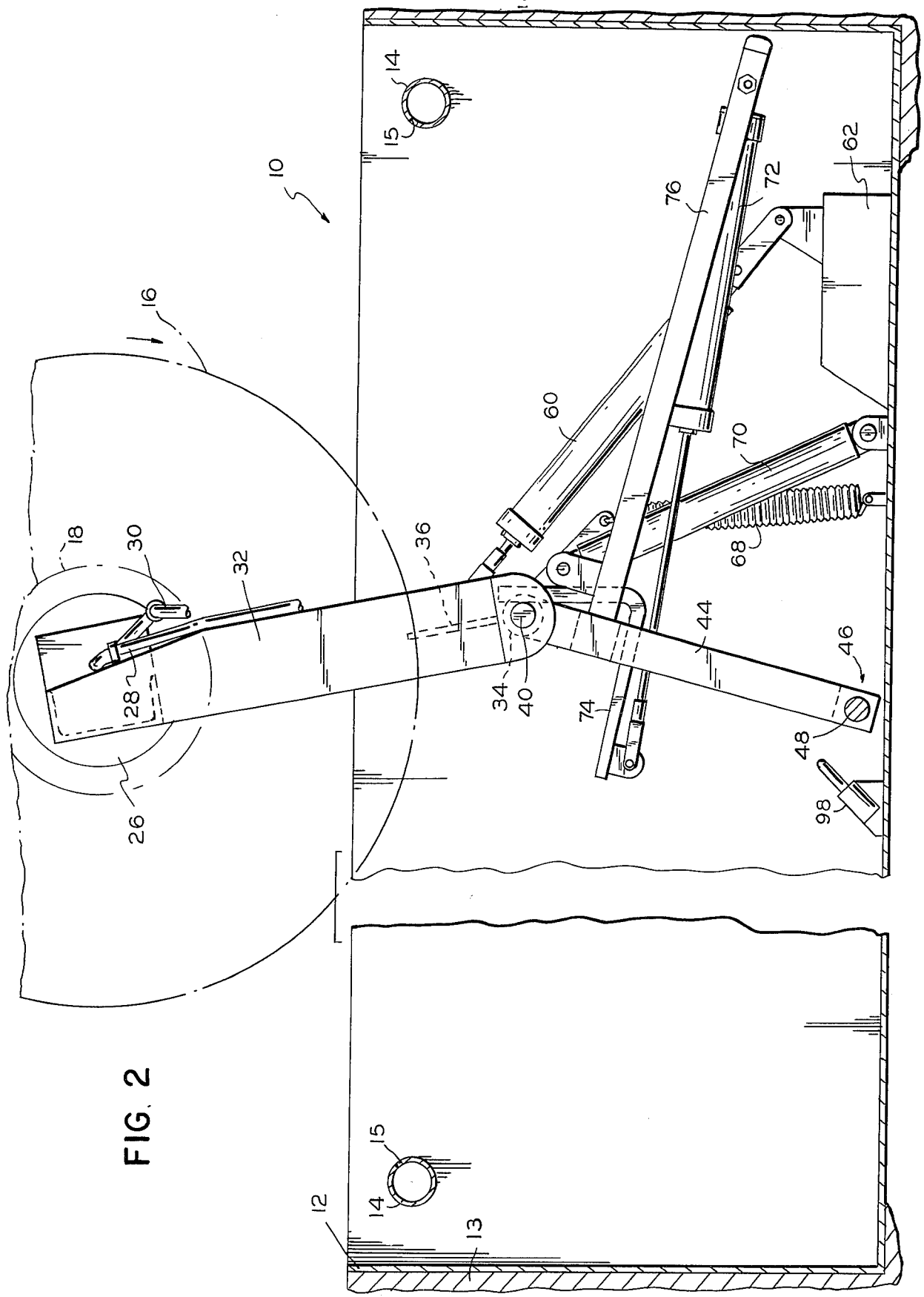
FIG. 2 is a fragmentary, vertical sectional view of the brush assembly of FIG. 1.

Referring now in detail to the drawings, there is shown therein a pit mounted brush assembly 10 forming one embodiment of the invention and including a tanklike pit shell 12 having spray pipes 14 serving as stiffeners and handles for installing and transporting the assembly and also supplied with soapy water to spray through nozzles 15. The shell is mounted in a pit 15 of a car wash. The assembly includes a rotary brush 16 mounted on a tubular core 18 having a disc 20 bolted to a rotor plate 22 driven by a hydraulic motor 24 mounted in a tubular housing 26 extending into the core 18. The motor is supplied with and exhausted by flexible hydraulic lines 28 and 30 strapped to arm 32 keyed to a tubular shaft 34 by a gusset 36 bolted to a lug 38 integral with the shaft 34. The tubular shaft is freely rotatable on arbor 40 carried by bearings 42 on arms 44 of a V-shaped, pivotal, carrier frame 46 having a shaft 48 journaled in bearings 50 bolted to the sides of the shell 12.

The frame 46 is pivotal by single action air cylinder drive 60 between a normal, upright position as shown in FIG. 3A a forward position shown in FIG. 3C, the cylinder drive being pivotally connected to a bracket 62 secured to the shell 12 and also being pivotally connected to a lug 64 on the frame 46. The arm 32 is pivotal between an extended position shown in FIG. 3C and a folded position shown in FIG. 3B. A counterweight 66 and a spring 68 urge the arm 32 toward its extended position, and a shock absorber or dashpot 70 is connected to the shaft 34 to slow movement of the arm 32. A double action cylinder drive 72 is connected pivotally at one end to an L-shaped arm 74 rigidly secured to the shaft 34, and is pivotally connected at its other end to a rigid U-shaped frame 76 welded to the frame 46.

A want 78 is positioned along the path of a car 82 to be washed so as to be sequentially engaged and disengaged by the car as the car is moved along the path of the car wash of which the pit mounted brush assembly forms a part. The wand 78 is engaged by the car as a bumper 84 of the car nears the brush assembly 10, and the wand opens a normal closed valve 86. This causes air under pressure to flow from a line 88 through the valve 86 to a four-way valve 87 to shift the valve 87 to a position connecting to atmosphere the right hand end of the cylinder 72. The wand also actuates pulses 89 to exhaust line 91 to permit the cylinder drive 60 to contract. Then, as the central portion of the front bumper 84 moves into contact with the brush 16, the car pushes the brush down to the position thereof shown in FIG. 3B, the brush cleaning the front and bottom of the central portion of the bumper and the central bottom portion of the front of the car body as this portion of the car passes over the bumper. Then, as rear bumper 92 nears the brush, the car moves out of engagement with the wand, the valve 86 recloses to cause the valve 87 to connect air to the cylinder drive 72 so as to extend the cylinder drive 72. This moves the arm 32 clockwise, as viewed in FIG. 3B to move the brush 16 into engagement with the central, rear portion of the car body to clean it. The counterweight 66 then goes overcenter. This causes the frame 46 to swing forwardly from the normal or retracted position thereof shown in FIG. 3B to the forward or extended position thereof shown in FIG. 3C, this swinging movement of the frame 46 serving to cause the brush to move forwardly with or follow the car to prolong contact of the brush with the car. During this movement, the brush cleans the central portions of the rear underside of the body and rear bumper 96. Soapy water is sprayed onto these front and rear portions of the car during movement.

When the brush has reached its extreme extended postion, the frame 46 engages a limit switch valve 98, which reverses the cylinder drive 60 and the frame 46 is swung back to its normal position shown in FIG. 3A, the arm 32 remaining in its extended position. The shell may have drain openings to permit the soapy water to drain.

EMBODIMENT OF FIGS. 5–7D

A pit mounted brush assembly 110 forming an alternate embodiment of the invention includes a tank-like pit shell 112 like the shell 12 along with spray pipes and nozzles and a drain (not shown) and mounted in a pit in a car wash. A rotary brush 116 is mounted on an arbor 118 mounted on a cantilever crossarm 119 and driven by a hydraulic motor 121 mounted on the crossarm 119 supplied and exhausted by flexible lines 128 and 130. The crossarm is welded to one side of an arm 132 pivotally mounted on a forked arm 134 between an extended or unfolded position engaging a stop 136 and a retracted or folded position engaging an adjustable stop 138. A cylinder drive 140 moves the arm 132 between these positions.

The arm 134 is welded to a sleeve 150 mounted on an arbor or post 152 by bearings 154. A flange 156 integral with the post is bolted to a mounting plate structure 158 secured to one side of the shell 112. A counterweight arm 160 welded to the sleeve 150 carries a counterweight 162 fixed in an adjusted position thereon by set screws 164. A stop 166 on the structure 158 limits downward movement of the arm 134.

Figure 7A:
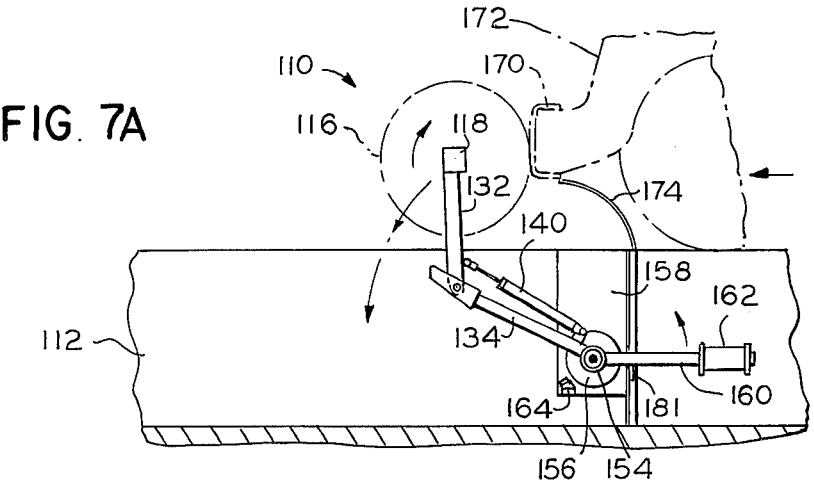
FIGS. 7A to 7D are a series of schematic views showing the sequence of operation of the brush assembly of FIG. 5.
Figure 7B:
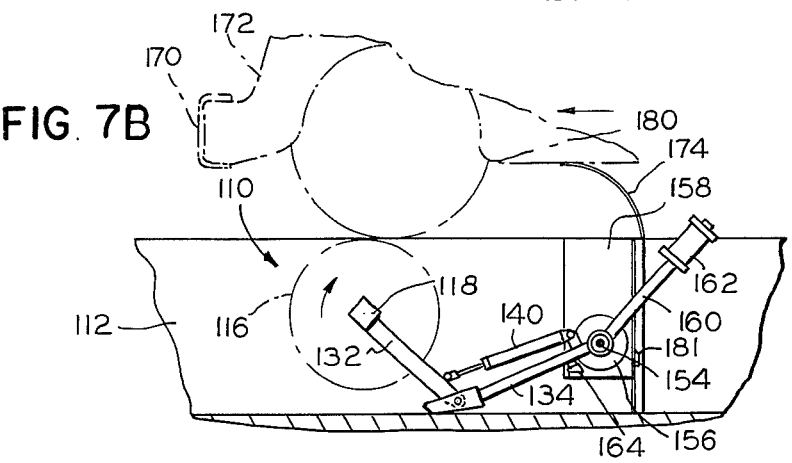
Figure 7C:
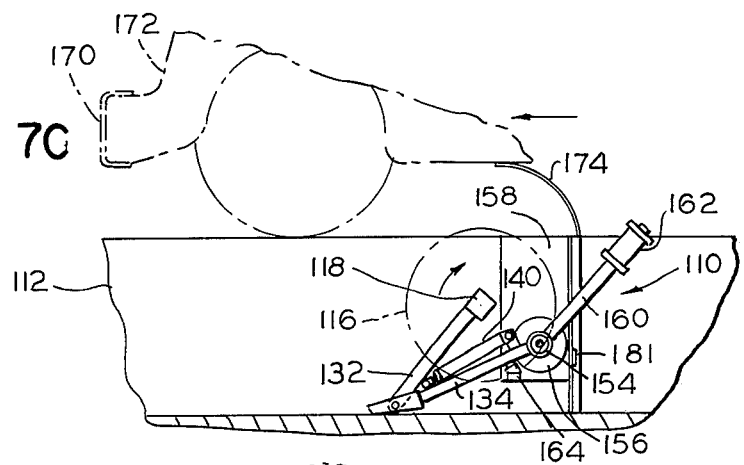
Figure 7D:
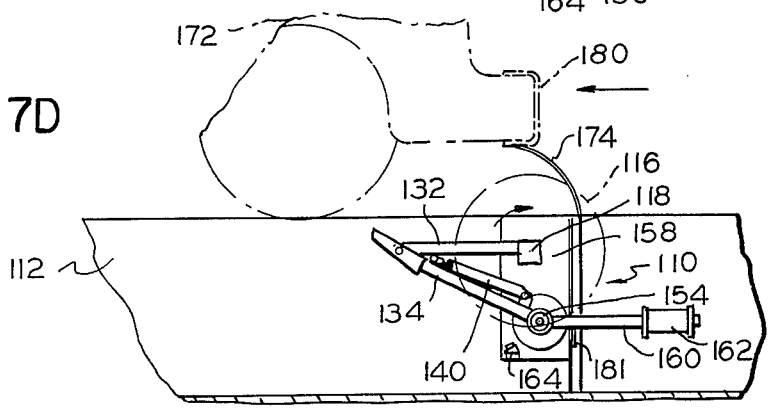

In the operation of the brush assembly 110, a central portion of a front bumper 170 of a car 172 engages a limit switch actuating wand 174 and also engages the brush 116 and pushes the brushes forwardly. This swings the arms 132 and 134 downwardly from their upper positions shown in FIG. 7A toward their retracted positions shown in FIG. 7B, the brush being swung to the left of the post 154 and the counterweight 162 being swung to be closer horizontally to the post 154 sufficient that the counterweight is overcome. The arms 132, 134 and 160 then continue to swing by gravity to the positions thereof shown in FIG. 7B. Actuation of the limit switch wand 174 causes the cylinder drive 140 to contract to fold the arm 132 back on the arm 134 to the position shown in FIG. 7C. This moves the center of gravity of the arms 132 and 134 and the brush and motor to the right sufficiently that the counterweight 162 then swings the arms 132, 134 and 160 and the brush to the positions thereof shown in FIG. 7D. Then, as the rear end of the car clears the wand 174, the cylinder drive 140 is rapidly extended to cause the brush to be swung upwardly and forwardly to engage and follow central rear portion 180 of the car and move to the position shown in FIG. 7A. A stop 182 limits clockwise travel of the arms.

The brush assembly 110 is, in effect, a balance beam. That is, the arbor 154 is the pivot point, the counterweighted arm 160 is one balance arm and a variable balance arm is the brush 116 and the folding linkage formed by the arms 132 and 134 and the cylinder drive 140. When the car 172 pushes the brush 116 sufficiently to the left, the effective length of the variable balance arm is increased thereby sufficiently to overbalance the counterweight, and the arms and brush swing counter-clockwise to their retracted positions shown in FIG. 7B wherein the brush is completely below the car. The arm 134 and the arm 60 remain in these positions until the contraction of the cylinder drive 140 has swung the arm 132 and the brush almost back to their positions shown in FIG. 7C to shorten the effective length of the variable balance arm sufficiently that the counterweight again overbalances the beam and the beam swings clockwise to its position shown in FIG. 7D, the counterweighting arm 160 in this position being substantially horizontal and having sufficient effective length to overbalance the beam even when the arms 132 and 134 are unfolded in scrubbing the rear end of the car as they return to the normal positions thereof shown in FIG. 7A, and the arms remain in these positions until the next car to be washed comes along. It should be noted that the brush 116 ends one washing cycle in its start position for another washing cycle so that cars to be washed can be spaced very close together.

I claim:
1. In a brushing device,
a brush,
carrier means normally holding the brush in a path of a car to be washed and permitting the brush to be moved by the car to an edge of the path,
and control means actuated by the car when the car reaches a predetermined position for moving the carrier means to cause the brush to move forwardly with the car to prolong contact of the brush and the car,
means for moving the carrier means to move the brush out of contact with the car after the front end portion of the car has passed the brush and for moving the carrier means to move the brush back into contact with the car as the rear end portion comes abreast of the brush.

2. The brushing device of claim 1 wherein the carrier means moves the brush downwardly out of the path of the car and upwardly into engagement with the car.

3. In a brushing device,
a shell,
a brush,
and brush carrier means mounted in the shell for moving the brush between a first position in the shell to a second position out of the shell,
the shell being adapted to be mounted in a car wash pit below the path of a car,
the brush carrier means being adapted to raise the brush out of the shell into the path of the front end portion of the car and to move the brush with the car as the rear end portion of the car is moved past the brush.

4. In a brushing device,
an open, pan-like shell,
a carrier frame mounted pivotally in the shell between a forward position and a rear position,
brush arm means mounted pivotally on the carrier frame between a folded position and an extended position,
a rotary brush means carried by the brush arm means,
frame positioning means normally urging the carrier frame toward its rear position and permitting movement of the carrier frame to its forward position,
and second positioning means for positioning the brush arm means on the carrier frame,
the second positioning means including overcenter means adapted to first urge the brush arm means toward its extended position and then to urge the brush arm means toward its folded position after the brush arm means has been moved away from its extended position.

5. The brushing device of claim 4 wherein the frame positioning means includes a fluid cylinder drive and the second positioning means includes a fluid cylinder drive.

6. The brushing device of claim 4 wherein the overcenter means includes a counterweight.

7. The brushing device of claim 4 wherein thee second positioning means include a cylinder drive and car position responsive means for actuating the cylinder drive to permit the brush arm means to be moved forwardly from its extended position to its folded position by engagement of the brush by the front end portion of a car advanced over the brushing device and to move the arm means from its folded position to its extended position as the rear end portion of the car is moved past the brush, the frame positioning means including a second cylinder drive responsive to the car position responsive means for moving the carrier frame from its rear position to its forward position as the rear end portion of the car is moved past the brush and for moving the carrier frame back to its rear position after it has arrived at its forward position.

8. In a car brushing apparatus, horizontal pivot means, beam means pivotal on the pivot means and including a first arm at one side of the pivot means and counterweight arm means at the other side of the pivot means, a brush, a second arm carrying the brush and mounted pivotally on the outer end of the first arm, positioning means for moving the second arm relative to the first arm between a retracted position folded back along the first arm and an extended position extending primarily upwardly from the first arm, first stop means limiting upward movement of the first arm to an upper position, and second stop means limiting downward movement of the first arm to a lower position, the effective lengths and weights of the arms, the brush and the counterweight arm means being such that the counterweight arm means overbalances the arms and the brush except when the second arm is in its extended position and the first arm is moved away from the upper position thereof in which condition the brush and the first and second arms overbalance the counterweight arm means.

9. In a car brushing apparatus, a beam including a first arm and a counterweight, means mounting the beam pivotally on a horizontal pivot axis positioned a predetermined distance below a path of a car advanced along the path, a brush, a second arm carrying the brush and mounted pivotally on the first arm between an extended position extending upwardly from the first arm and a retracted position extending back along the first arm, and positioninng means adapted to fold the second arm to its retracted position after the car has pushed the brush forwardly and downwardly and to move the second arm to its extended position to move the brush into engagement with and follow the rear end of the car as the rear end of the car moves over the brush.

10. The car brushing apparatus of claim 9 wherein the effective length and weight of the first and second arms and the brush is such as to overbalance the counterweight only when the first arm is away from an extreme upper position thereof and the second arm is in its extended position.

* * * * *